J. J. KWIS.
CLUTCH.
APPLICATION FILED NOV. 20, 1912.

1,164,531.

Patented Dec. 14, 1915.

Witnesses
E. B. Gilchrist
N. C. Hubbard

Inventor
Joseph J. Kwis
by Thurston T. Kwis
Attys.

UNITED STATES PATENT OFFICE.

JOSEPH J. KWIS, OF FINDLAY, OHIO, ASSIGNOR TO THE ADAMS BROTHERS COMPANY, OF FINDLAY, OHIO, A CORPORATION OF OHIO.

CLUTCH.

1,164,531.  Specification of Letters Patent.  Patented Dec. 14, 1915.

Application filed November 20, 1912. Serial No. 732,401.

*To all whom it may concern:*

Be it known that I, JOSEPH J. KWIS, a citizen of the United States, residing at Findlay, in the county of Hancock and State of Ohio, have invented a certain new and useful Improvement in Clutches, of which the following is a full, clear, and exact description.

This invention relates to clutches of the multiple disk type and has for its object the provision of a clutch of this character, wherein there are embodied the features of high efficiency, large friction surface, and at the same time compactness both axially and radially of the clutch, durability, simplicity of construction, and ease of assemblage, disassemblage, or adjustment.

A clutch embodying these and other desirable features is obtained by my invention which may be here briefly summarized as consisting in certain novel details of construction and combinations and arrangements of parts which will be described in the specification and set forth in the appended claims.

Figure 1:
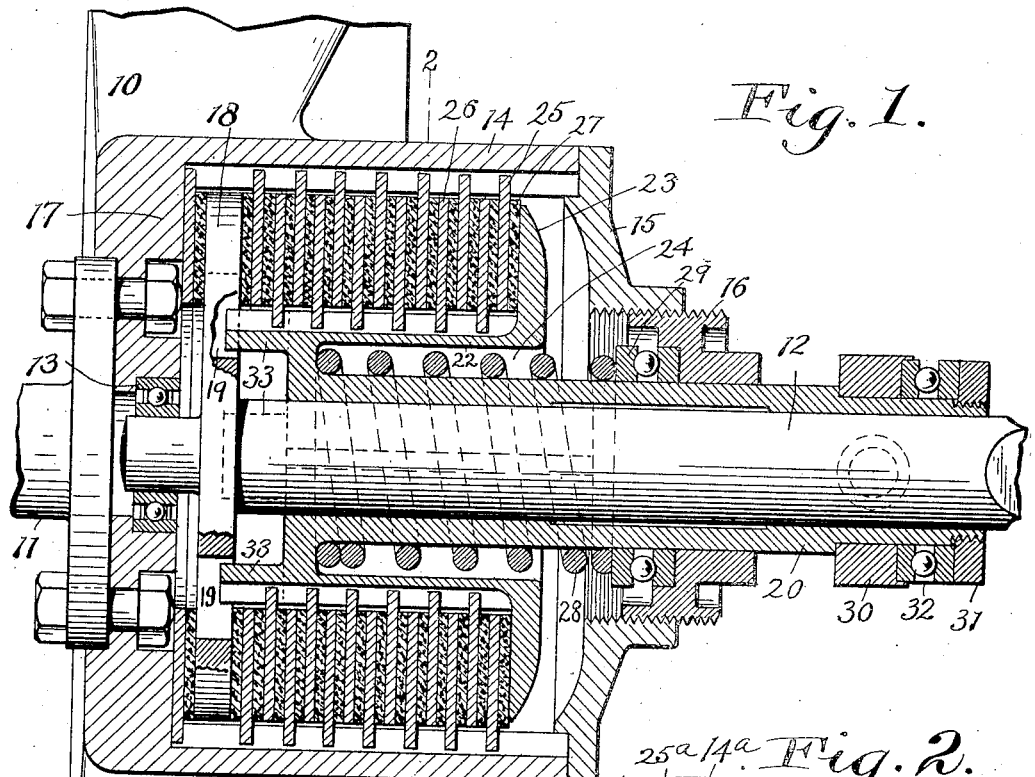
Figure 2:
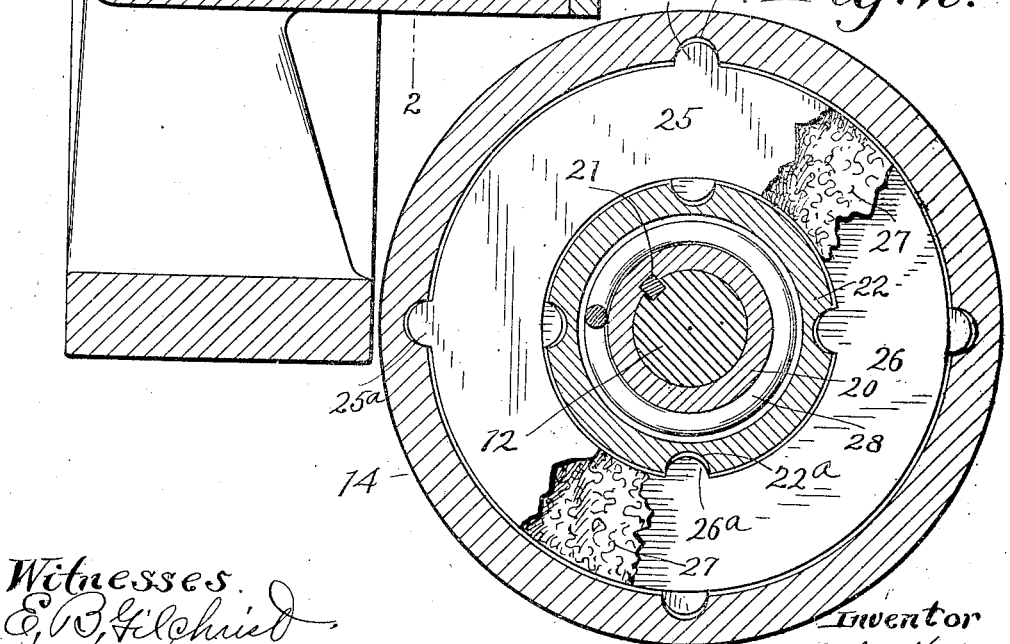

In the accompanying sheet of drawings, wherein I have shown the preferred form of my invention which answers the requirements very effectively, Figure 1 is a longitudinal sectional view through the clutch and associated parts, certain portions being in elevation and other portions being broken away for the sake of clearness; and Fig. 2 is a transverse sectional view substantially along the line 2—2 of Fig. 1.

My clutch is adapted particularly for use in connection with motor driven vehicles, and in this case, it is incorporated in the fly wheel 10 of an internal combustion engine (not here shown), the fly wheel 10 being bolted in the usual manner to the engine crank shaft 11, only a portion of which is shown. The shaft 11 and fly wheel 10 are therefore the driving members, which through the medium of the clutch drive the driven shaft 12 which is in alinement with the shaft 11, and at its inner end is supported at the center of the fly wheel hub by an annular ball bearing 13. Practically all parts of the clutch are inclosed within a cylindrical housing 14, the body of which is in this instance formed integral with the fly wheel, the housing facing rearwardly (with respect to the driving part) and having at its rear end a closing cover 15 which may be bolted to the end of the housing. The cover 15 is provided with a central flanged aperture which is threaded on the interior and receives an adjusting nut 16, the function of which will appear later.

The driven shaft 12 is provided near its forward end and near the base or inner end 17 of the housing with an annular outwardly projecting flange 18 which extends nearly to the cylindrical wall of the housing, this flange being provided with a plurality of openings 19 arranged about the axis of the shaft and for a purpose to appear presently.

The driven shaft 12 is provided with a sleeve 20, which is connected to the shaft by a spline or feather 21 which forms a driving connection between the sleeve and shaft and allows axial movement of the sleeve on the shaft so as to enable the clutch to be thrown in or out. This sleeve projects into the housing and near its forward end, a short distance to the rear of the disk 18, this sleeve projects outwardly and thence has a cylindrical return portion 22 in the form of a rearwardly extending cylindrical flange or annulus. At its rear end, the cylindrical flange 22 is provided with a radial flange 23 which projects nearly to the cylindrical wall of the housing. This construction provides between the cylindrical flange 22 and the cylindrical body of the sleeve an annular axially extending recess or chamber 24.

The actual clutching members consist of two series of disks, including a series of driving disks 25, and a series of driven disks 26, the disk of the two series being alternately arranged in the usual manner. The disks of one series, and in this case, the driving series are faced with usual frictional material 27. The housing and driving disks are in driving engagement by means of interlocking portions consisting in this case of a series of lugs $25^a$ at the outer periphery of the disks engaging in a series of axially extending grooves $14^a$ in the cylindrical wall of the housing, which grooves extend from the base or end 17 of the housing to the rear end of the cylindrical portion. In a similar manner, the driven disks are in driving engagement with the annulus or cylindrical flange 22 of the sleeve, this driving engagement being effected by interlocking portions consisting in this case of lugs 26ª at the inner periphery of the driven disks engaging in grooves 22ª extending axially or longitudinally of the periphery of the annulus.

The clutch is thrown "in" by means of a rather stiff coil spring 28, the principal portion of which is located in the annular chamber 24. The forward end of the spring bears against the base or closed end of the chamber 24, and the rear end bears against one ring of an annular ball and ring thrust bearing 29 which is between the spring and the nut 16 previously referred to. To throw the clutch "out," the sleeve 20 is provided near its rear end with a shifter ring 30, to which the usual clutch shifting mechanism may be connected, this ring being held in position by a nut 31 and an annular ball and ring thrust bearing 32, which is located between the ring and the nut.

It will be noted that one of the driving disks 25 is located between the closed end 17 of the housing and the flange or disk 18 on the driven shaft 12. This flange therefore constitutes one of the driven members and assists the other disks 26 in transmitting power between the driving and driven shafts. I prefer to employ the flange 18 for the reason that this flange transmits a considerable part of the power between the driving and driven shafts, and thus relieves the key or feather 21 of some of the stresses to which the key would ordinarily be subjected, if all the power were transmitted from the driven member to the sleeve 20, and thence to the driven shaft 12.

It will be noted that the inner end of the sleeve 20 is provided with lugs 33 which project axially or forwardly of the body of the sleeve or of the annulus 22 into the openings 19 (previously referred to) of the flange 18. This construction enables the use of a large number of driving and driven disks and permits practically all of the space axially considered on the interior of the housing to be occupied by the disks, there being just sufficient space between the radial flange 23 on the annulus 22 and the cover 15 to permit the sleeve to be retracted and allow the driving and driven disks to move out of driving engagement. Furthermore, the lugs prevent the forwardmost driven disk 26 from dropping off the annulus, and prevent the consequent disengagement of the driving lugs 22ª of said disk with the grooves in the annulus 22 and in the lugs 32, when the sleeve is retracted to throw the clutch "out." Still further, the provision of the lugs 33 which move in and out of the openings 19 of the flange 18, allow considerable adjustment of the sleeve 20 relative to the disk, as long usage and the resultant wear from time to time require adjustment, by simply adjusting or tightening the nut 16, the lugs 33 then entering farther into the openings 19.

It will be seen that the advantages previously enumerated are attained by this invention, the features of compactness, ease of assemblage and simplicity being particularly obvious. It will be seen from the drawing that practically all the space in the housing is utilized to advantage by reason of the shape and arrangement of the parts therein; that all the principal parts, except the rear end of the sleeve are inclosed; that the adjustment is effected at a single point, and that the housing itself is small, both axially and radially. This is a matter of considerable importance, especially in certain types of motor driven vehicles, wherein it is highly desirable that the clutch be encompassed in as small a space as possible. By providing a clutch of small diameter, compared with the efficiency and power of the clutch, the clutch is admirably adapted for use with those cooling systems for internal combustion engines of vehicles in which the arms of the fly wheel serve as fan blades to draw air rearwardly through the space between the clutch and the outer rim of the fly wheel.

It is obvious that the construction is susceptible of numerous more or less minor changes without affecting the main features of my invention. For example, while the driven shaft 12 is preferably provided with a flange 18, for the reasons previously stated, this flange may be omitted. The frictional material between the opposing faces of the driving and driven disks could be omitted, especially if the clutch casing is supplied with a quantity of lubricant.

Having thus described my invention, what I claim is:

1. In a friction clutch, a housing, a shaft extending into the housing, a series of friction clutch members connected to the housing, a sleeve keyed to the shaft and slidable axially along the same, said shaft and said sleeve having friction driving members which coöperate with the friction driving members connected to the housing to form driving engagement between the latter and said shaft and a spring acting on said sleeve to force the driving members into engagement.

2. In a friction clutch, a housing, a shaft extending into the housing and provided with an outwardly extending friction driving disk, a sleeve having driving engagement with said shaft and slidable along the same, a plurality of friction driving members connected to the sleeve, a plurality of friction driving members connected to the housing and coöperating with said disk and said driving members connected to the sleeve, and means for holding the driving members in engagement.

3. In combination in a friction clutch, driving and driven members, one of said members having a plurality of friction driving members connected thereto, the other member comprising a shaft and a sleeve slidable axially of the shaft, both said shaft and said sleeve having friction driving members which are adapted to coöperate with and extend between said first named driving members, and means for holding the driving members in engagement.

4. A clutch comprising a housing, a shaft extending into said housing and provided at its inner end with a substantially radial friction driving disk having openings therein, a sleeve having driving engagement with said shaft and slidable along the same, said sleeve having within the housing an enlarged portion provided with lugs projecting into said openings of the disk, two series of alternately arranged friction driving disks respectively connected to the wall of the housing and to said enlarged portion of the sleeve, a cover for the housing having a centrally arranged adjustable member through which the shaft and sleeve extend, and a spring between said adjustable member and portion of said sleeve, said housing and said enlarged portion of the sleeve having abutments between which the disks are adapted to be compressed.

5. A clutch comprising a cylindrical housing, a shaft extending axially into said housing and provided at its inner end with a flange having openings therein, a sleeve having driving engagement with the shaft and slidable along the same, said sleeve being provided within the housing with a cylindrical enlarged portion or annulus having an inner cylindrical recess, and said annulus having at one end lugs projecting into the openings of said flange and having at the opposite end a flange extending toward the cylindrical wall of the housing, alternately arranged driving and driven disks between said flange of the annulus and the end of the housing and connected respectively to the cylindrical wall of the housing and to said annulus, a cover for said housing having a centrally arranged adjustable nut surrounding the shaft and a portion of the sleeve extending from the housing, and means for holding the disks in driving engagement comprising a spring located between the nut and the base of said annular recess.

In testimony whereof, I hereunto affix my signature in the presence of two witnesses.

JOSEPH J. KWIS.

Witnesses:
 JNO. SHERIDAN,
 H. W. MUTEY.